(12) United States Patent
Seo et al.

(10) Patent No.: US 11,601,745 B2
(45) Date of Patent: Mar. 7, 2023

(54) EAR TIP INCLUDING FLANGE MADE OF SILICONE FOAM MATERIAL

(71) Applicant: BUJEON CO., LTD., Ansan-si (KR)

(72) Inventors: Donghyun Seo, Ansan-si (KR); Kyoungsik Lee, Hwaseong-si (KR); Minkoo Park, Hwaseong-si (KR); Jeongsun In, Ansan-si (KR)

(73) Assignee: BUJEON CO., LTD., Ansan-si (KR)

( * ) Notice: Subject to any disclaimer, the term of this patent is extended or adjusted under 35 U.S.C. 154(b) by 0 days.

(21) Appl. No.: 17/411,165

(22) Filed: Aug. 25, 2021

(65) Prior Publication Data

US 2022/0408176 A1    Dec. 22, 2022

(30) Foreign Application Priority Data

Jun. 17, 2021    (KR) .................. 10-2021-0079016

(51) Int. Cl.
*H04R 1/10* (2006.01)
*B29C 45/14* (2006.01)

(52) U.S. Cl.
CPC ..... *H04R 1/1058* (2013.01); *B29C 45/14065* (2013.01); *H04R 1/1016* (2013.01); *B29C 45/14795* (2013.01)

(58) Field of Classification Search
CPC .. H04R 25/652; H04R 25/654; H04R 25/656; H04R 2225/77
See application file for complete search history.

(56) References Cited

U.S. PATENT DOCUMENTS

| | | | |
|---|---|---|---|
| 2,325,590 A * | 7/1943 | Carlisle ................ | H04R 25/652 381/328 |
| 4,969,534 A * | 11/1990 | Kolpe ................ | H04R 25/658 381/372 |
| 8,348,011 B1 | 1/2013 | Huang | |
| 8,761,424 B2 * | 6/2014 | Wubker ................ | H04R 1/1016 381/325 |
| 8,800,712 B2 * | 8/2014 | Campbell ............ | H04R 25/652 181/135 |
| 9,277,336 B2 * | 3/2016 | Møller ................ | H04R 25/654 |
| 9,438,989 B2 * | 9/2016 | Chu ...................... | H04R 1/2811 |
| 9,467,787 B2 * | 10/2016 | Lim .................... | H04R 25/654 |
| 9,980,067 B2 * | 5/2018 | Dorn .................... | H04R 25/654 |
| 10,425,714 B2 * | 9/2019 | Lawand ............... | H04R 1/1016 |
| 10,735,875 B2 * | 8/2020 | Møller ................. | H04R 25/456 |
| 10,911,856 B2 * | 2/2021 | Ng ...................... | H04R 1/1058 |
| 11,140,498 B2 * | 10/2021 | Barrett ................. | H04R 25/652 |

(Continued)

FOREIGN PATENT DOCUMENTS

| | | | | |
|---|---|---|---|---|
| CN | 202121744 U | * | 1/2012 | .............. H04R 1/02 |
| CN | 102833643 A | * | 12/2012 | |

(Continued)

*Primary Examiner* — Ryan Robinson
(74) *Attorney, Agent, or Firm* — KORUS Patent, LLC; Seong Il Jeong

(57) ABSTRACT

Disclosed herein is an ear tip having a flange made of silicone foam, the ear tip including a central core and a flange surrounding the core. The flange is made of silicone foam, and the core is made of a material harder than the silicone foam. Before the silicone is molded, attachable films or tapes may be attached to the top and bottom surfaces of the mesh, thereby preventing burrs generated during the molding of silicone from adhering to the mesh.

5 Claims, 6 Drawing Sheets

(56) References Cited

U.S. PATENT DOCUMENTS

| | | | |
|---|---|---|---|
| 11,218,819 B2* | 1/2022 | Junke | H04R 25/656 |
| 11,323,796 B2* | 5/2022 | Fukahori | G06F 3/044 |
| 2012/0250923 A1* | 10/2012 | Beck | H04R 25/658 |
| | | | 29/896.21 |
| 2013/0051590 A1* | 2/2013 | Slater | H04R 25/652 |
| | | | 381/317 |
| 2017/0347212 A1* | 11/2017 | Lotter | H04R 25/656 |
| 2019/0208303 A1* | 7/2019 | Monti | H04R 25/656 |
| 2020/0288251 A1* | 9/2020 | Kuipers | H04R 25/456 |
| 2021/0298619 A1* | 9/2021 | Stephenson | A61B 5/02416 |
| 2021/0315740 A1* | 10/2021 | Lonsky | H04R 25/652 |
| 2022/0070573 A1* | 3/2022 | Møller | H04R 25/652 |
| 2022/0248147 A1* | 8/2022 | Talaslian | H04R 25/656 |

FOREIGN PATENT DOCUMENTS

| | | | | |
|---|---|---|---|---|
| CN | 106921899 A * | 7/2017 | | H04R 1/1016 |
| DE | 102012201216 A1 * | 8/2013 | | H04R 25/656 |
| EP | 1995991 A2 * | 11/2008 | | H04R 25/60 |
| EP | 3648468 A1 * | 5/2020 | | H04R 1/023 |
| EP | 3419311 B1 * | 8/2020 | | H01Q 1/22 |
| JP | 2662015 B2 * | 10/1997 | | |
| KR | 10-2016-0028298 A | 3/2016 | | |
| KR | 20180052855 A * | 5/2018 | | |
| KR | 10-2065551 B1 | 1/2020 | | |
| KR | 10-2260760 B1 | 6/2021 | | |
| WO | WO-2011050862 A1 * | 5/2011 | | H04R 25/65 |
| WO | WO-2013050094 A1 * | 4/2013 | | H04R 25/654 |
| WO | WO-2018141386 A1 * | 8/2018 | | H04R 25/48 |
| WO | WO-2022154344 A1 * | 7/2022 | | |

\* cited by examiner

Prior Art

EAR TIP INCLUDING FLANGE MADE OF SILICONE FOAM MATERIAL

CROSS-REFERENCE TO RELATED APPLICATION

This application claims the benefit of Korean Patent Application No. 10-2021-0079016 filed on Jun. 17, 2021, which is hereby incorporated by reference herein in its entirety.

BACKGROUND

1. Technical Field

The present invention relates to an ear tip having an elastic structure that is made of a silicone foam material. More specifically, the present invention relates to an ear tip that can be elastically mounted in the ear canal and can improve wearing comfort and cleanliness, implement an aesthetic design, and prevent the introduction of foreign substances.

2. Description of the Related Art

An ear tip or audio fit that is coupled to the sound emission hole of an earphone, which is a sound device, is widely known.

As shown in FIG. 1A, a conventional ear tip 1' includes a cylindrical core 2a' coupled directly to the housing of an earphone, and an outer flange 4a' surrounding the core 2a'. In the case of the core 2a', the wearing comfort for installation in the ear canal of an ear varies depending on the length of the core 2a', the hardness of the core 2a' must be determined based on the wearing comfort, and the core 2a' must be designed by taking into consideration detachment force. The main function of the flange 4a' is to maintain or improve a sound insulation property when the ear tip 1' is inserted into the ear canal, and the sound insulation property varies depending on the shape of the flange.

FIG. 1B shows a disadvantage that occurs when another conventional ear tip 1' is inserted into the external acoustic canal of the ear. The flange 4a' hits the primary bend of the inner acoustic canal of the ear and is blocked. The reason for this is that the structure of the flange 4a' is rigid and it is difficult to impart elasticity. Accordingly, wearing comfort and a sound insulation property are also deteriorated.

In order to overcome these problems, U.S. Pat. No. 8,348,011 (registered on Jan. 8, 2013) discloses a structure in which a concave groove 231a' is formed in an ear tip 23a', a core 21a' and a flange 22a' are divided by using the concave groove 231a' as a boundary, and the flange 22a' is bent, as shown in FIG. 2. However, there is a limitation in that only the concave groove 231a' allows the outer portion of the flange 22a' to be bent sufficiently. Reference numeral 213a' denotes a filter.

In light of this circumstance, the present inventors have proposed an ear tip 1' in which a flange 2' and a core 20' are included, an upper portion 6' is formed in a curved surface inclined slightly downward from the apex of a dome portion 4' toward the inside of the ear tip 1', a channel 10' is formed in connection with an inner edge portion 8', and a gap d' is formed such that the apex of the dome portion 4' is higher than the upper end of the inner edge portion 8', as shown in FIG. 3, in Korean Patent Application No. 10-2020-0058522 (issued on Apr. 26, 2021). A connecting portion 12' extends to be inclined out of the ear tip 1'. Since the upper part 6', the inner edge portion 8', and the connection portion 12' are structurally connected around a point P', which is the intersection thereof, the dome portion 4' of the ear tip 1' may provide elasticity and flexibility to allow deformation in the width and height directions according to the shape of the ear canal.

The core 20' includes a sidewall 22', a top surface 28' formed around the lower end of the sidewall 22', a passage surface 26' extending shortly and vertically downward from the inner side of the upper surface 28', and a rim 24' extending downward from the lower end of the passage surface 26' toward the outside. In the above structure, it is not essential to make the flange 2' of a material softer than that of the core 20'. When they are made of the same material, it is convenient to injection-mold them in an integrated form.

Based on the above application, the present inventors have developed an ear tip that can be manufactured at higher design levels over a wider range by making a flange of a material softer than that of a core.

SUMMARY

Therefore, an object of the present invention is to provide an ear tip made of a flexible and soft material that can provide sufficient elasticity and directionality to the flange of the ear tip.

An object of the present invention is to provide an ear tip that has a structure capable of preventing foreign substances from entering the inside of the device.

In order to accomplish the above objects, the present invention provides an ear tip having a flange made of silicone foam, the ear tip including a central core and a flange surrounding the core, wherein the flange is made of silicone foam, and the core is made of a material harder than the silicone foam.

The core may include an upper wall formed above a mesh slot in which a mesh is mounted, and a lower part integrated with the upper wall, formed below the mesh slot, and provided with a horizontal portion protruding inward and a vertical portion extending downward from the horizontal portion in an integrated form, and a base including a hook-shaped protrusion protruding inward may be formed below the lower part.

The flange may be manufactured in a structure that covers the overall core except for a bottom surface of the core, the flange may include a sound emission hole extending above the upper wall, a flange upper wall configured to come into close contact with and completely cover an outer surface of the upper wall, and a flange lower wall extending below the flange upper wall based on the mesh slot, the flange lower wall may have a thinner thickness than the flange upper wall, and a dome portion extending further below the flange lower wall while expanding outward from a side surface of the flange upper wall may be formed around the upper flange wall and the lower flange wall.

A space may be formed between the flange lower wall and the dome portion, and a lower edge provided by the dome portion and extending further below the bottom surface of the core may provide a space, which facilitates the deformation of the flange when the ear tip is worn.

The flange lower wall and the dome portion may be made in an integrated form such that no space is formed therebetween, and a lower edge provided by the dome portion and extending further below the bottom surface of the core may provide a space, which facilitates the deformation of the flange when the ear tip is worn.

According to another aspect, the present invention provides a method of manufacturing the ear tip, the method including: molding the core by inserting a mesh as an insert and then injecting plastic resin; and molding the flange by foam-molding a silicone material, forming the flange, on the mold of the mesh and the core.

The method may further include, before molding the silicone, attaching attachable films or tapes to the top and bottom surfaces of the mesh, thereby preventing burrs generated during the molding of silicone from adhering to the mesh.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Objects and effects of the present invention, and technical configurations for achieving them will become apparent from the embodiments described later in detail in conjunction with the accompanying drawings. In the following description of the present invention, when it is determined that a detailed description of a well-known function or configuration may unnecessarily make the gist of the present invention obscure, the detailed will be omitted.

Throughout the specification, when a portion is described as "including" a component, it means that the portion may further include another component, rather than excluding the other component, unless otherwise stated. Meanwhile, in an embodiment of the present invention, each of the components, functional blocks or means may include one or more sub-components.

Figure 1A:
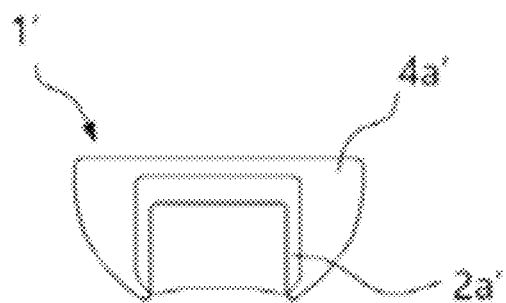
FIG. 1A is a diagram of a conventional ear tip.
Figure 1B:
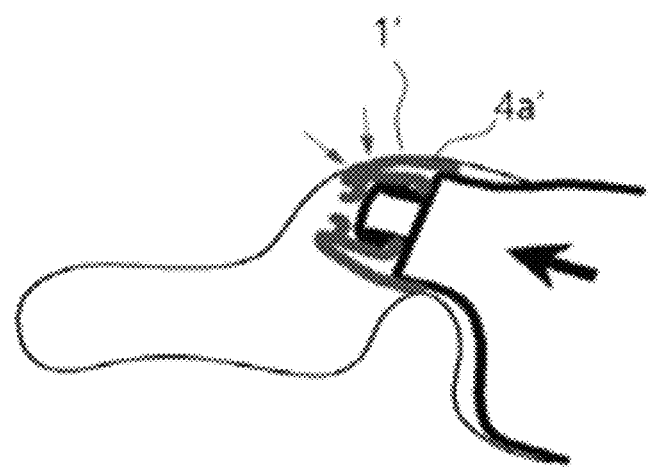
FIG. 1B is a diagram showing the conventional ear tip inserted into the external acoustic canal of the ear.
Figure 2:
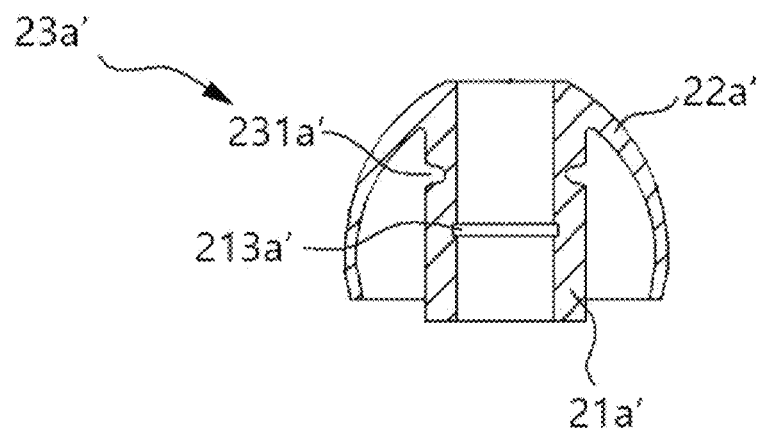
FIG. 2 is a sectional view of another conventional ear tip.
Figure 3:
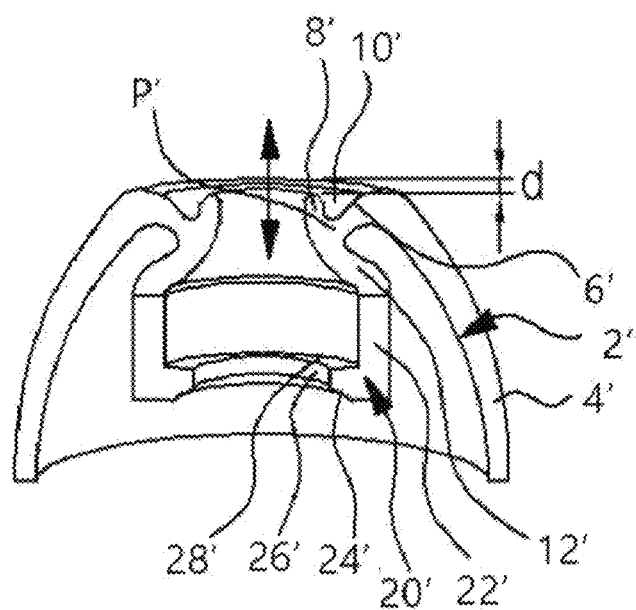
FIG. 3 is a perspective view of an overall ear tip disclosed in a previous application of the present applicant.
Figure 4:
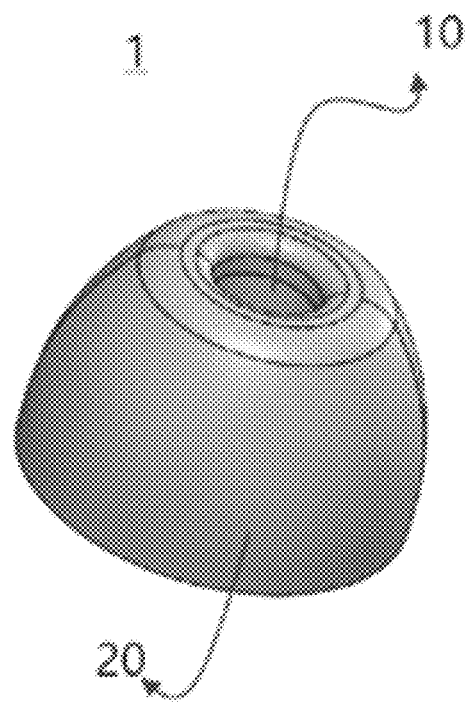
FIG. 4 shows an overall perspective view of an ear tip according to an embodiment of the present invention.

FIG. 4 shows an overall perspective view of an ear tip 1 according to an embodiment of the present invention. The ear tip 1 includes a central core 10 and a flange 20 surrounding the core 10. It is preferable that the core 10 be made of a hard material and the flange 20 be made of a material softer than that of the core 10, particularly silicone foam in the embodiment of the present invention. Although the ear tips of commercially available canal-type earphones are made in integrated forms and use silicone tips or otherwise use softer foam tips than silicone tips, a "silicone foam tip" made of a flange material is used in the present invention. Silicone foam has considerably desirable heat resistance, cold resistance and electrical insulation, so that it may be used in a wide range of −50 to 200 degrees. It has a little change in curing or expansion depending on temperature, is easy to change its shape, and is softer than silicone, so that it has the advantage of providing comfort when worn in the ear canal.

Figure 5:
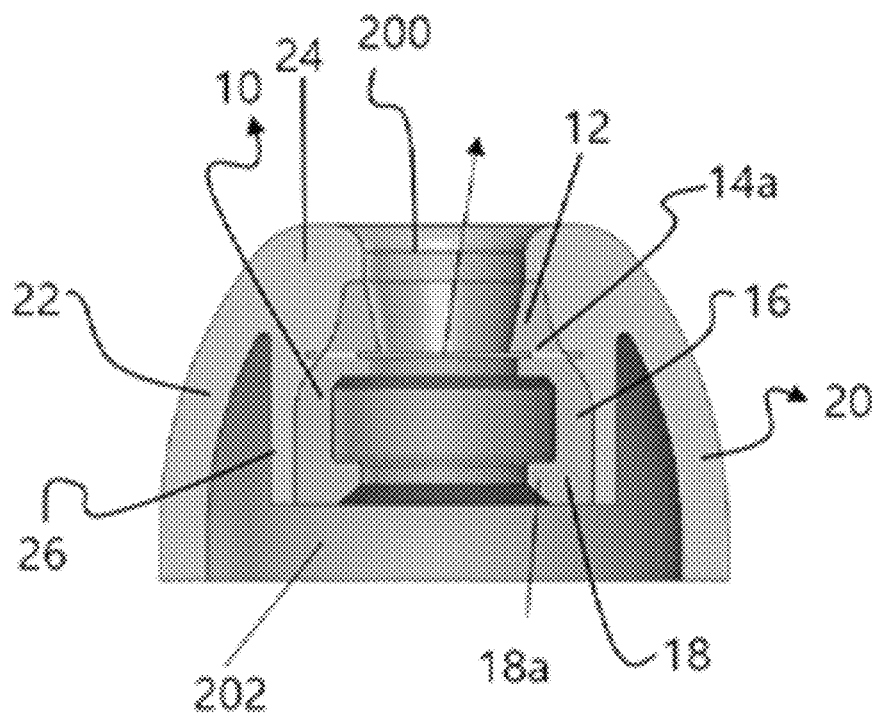
FIG. 5 is a sectional view of the ear tip shown in FIG. 4.

FIG. 5 is a sectional view of the ear tip 1 according to the embodiment of the present invention.

The core 10 includes an upper wall 12 that gradually decreases in diameter in a downward direction. A mesh slot 14a in which the mesh M is mounted is formed under the upper wall 12. Below the mesh slot 14a, there is formed a lower part 16 including a horizontal portion protruding slightly inward and a vertical portion integrally extending downward from the horizontal portion. The diameter of a space provided by the lower part 16 is relatively uniform and larger than that of the upper wall 12. A base 18 including a hook-shaped protrusion 18a slightly protruding inward is formed in the bottom of the lower part 16. A substantial portion of the lower part 16 and the base 18 are designed and manufactured to fit the shape and structure of the sound emission hole of the housing of a speaker (not shown).

Since the flange 20 is made of a silicone foam material, it is molded to be relatively large unlike those of the conventional ear tips, and is manufactured in a structure that almost covers the core 10 except for the bottom surface of the core 10. More specifically, the flange 20 includes a flange upper wall 24 in which a sound emission hole 200 extends beyond the upper wall 12 and which comes into close contact with and completely covers the outer surface of the upper wall 12. A flange lower wall 26 extends downward from the bottom of the flange upper wall 24 based on the mesh slot 14a, and covers both the outer side surfaces of the lower part 16 and the base 18. The flange lower wall 26 has a smaller thickness than the flange upper wall 24. In addition, a dome portion 22 extending further downward below the flange lower wall 26 while expanding outward from the side surface of the flange upper wall 24 is formed around the flange upper wall 24 and the flange lower wall 26. The space formed between the flange lower wall 26 and the dome portion 22 and the space formed by a lower edge 202 provided by the dome portion 22 and further extending below the bottom surface of the core 10 allow the flange 20 to be more easily deformed when a user wears the ear tip 1.

Since the flange 12 of the present invention is made of silicone foam and has desirable deformability, it can be manufactured in a simple and large shape rather than a shape having a fine and sophisticated joint structure. In addition, since the flange upper wall 24 comes into direct contact with the external acoustic canal of the ear on the portion of the flange upper wall 24 above the top surface of the core 10, it may be freely deformed in accordance with the size and structure of the ear and may give comfort to the user, and also the problem in which sound quality in a low-frequency band is degraded may be solved. In addition, the foam material is foamable and may thus transmit sound and air to a certain extent, so that it may be more advantageously applied to the flange of the ear tip than other materials.

Figure 6:
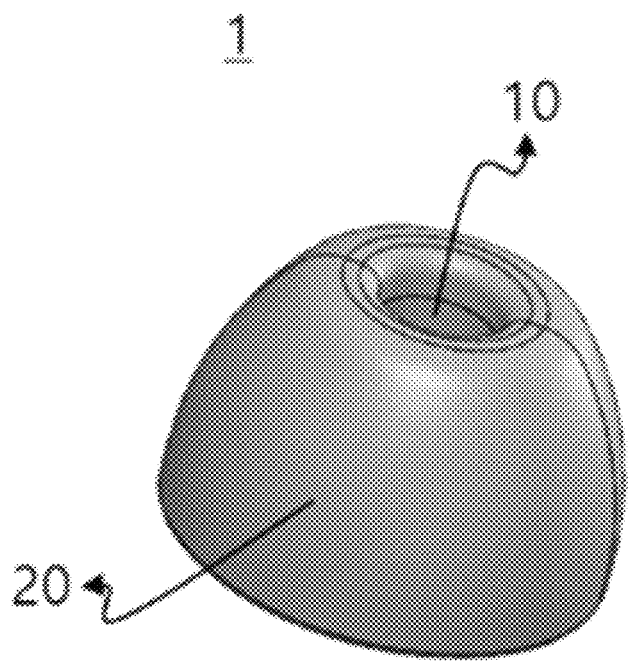
FIG. 6 is a perspective view of an overall ear tip according to another embodiment of the present invention.
Figure 7:
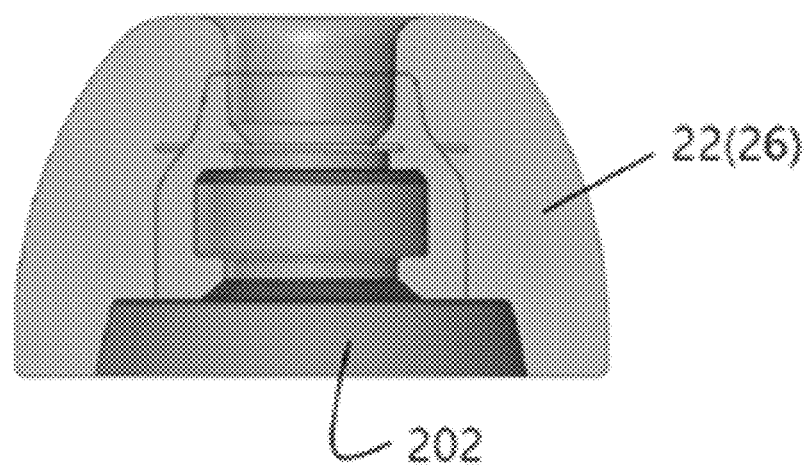
FIG. 7 is a sectional view of the ear tip shown in FIG. 6.

FIG. 6 is a perspective view of an overall ear tip 1 according to another embodiment of the present invention, and FIG. 7 is a sectional view of the ear tip 1 shown in FIG. 6.

The ear tip 1 includes a central core 10, and a flange 20 surrounding the core 10. It is preferable that the flange 20 be made of silicone foam that is softer than that of the core 10. When the core 10 is made of silicone resin and the flange 20 is made of silicone resin foam, the above condition may be satisfied and also the time required for a molding process may be shortened.

The present embodiment is different from the above embodiment in that the gap between a flange lower wall 26 and a dome portion 22 is eliminated using the advantage of the silicone foam material that allows the flange 20 to be easily deformed and only a lower edge 202, which extends further below the bottom surface of the core 10, is formed to provide an empty space for the entrance of a housing (not shown) to be inserted. A flange may be formed in an integrated form without a clear distinction between members, unlike in the above-described embodiment. Even when the ear tip 1 is manufactured in this manner, the same effect may be expected as in the previous embodiment. Since the shape of the flange 20 is simple, the advantage of easy manufacturing may be utilized.

In the ear tip 1 of the present invention, the mesh M is mounted in the mesh slot 14a, and functions to block foreign substances or dust.

In the process for manufacturing the ear tip 1 of the present invention, the mesh M and the core 10 are injection-molded in an integrated form by fixing the mesh M into the hole of the molding device as an insert and injecting a silicone resin forming the core 10, the flange 20 is molded by injecting silicone, and a foaming process is performed.

Conventionally, when polyurethane foam is molded, adhesion is performed using a primer upon the attachment of plastic resin or silicone resin. In the case of the foam tip according to the embodiment of the present invention, the core portion is made of silicone resin and silicone foam is applied to the flange portion, so that workability is shortened by working without a primer.

Figure 8:
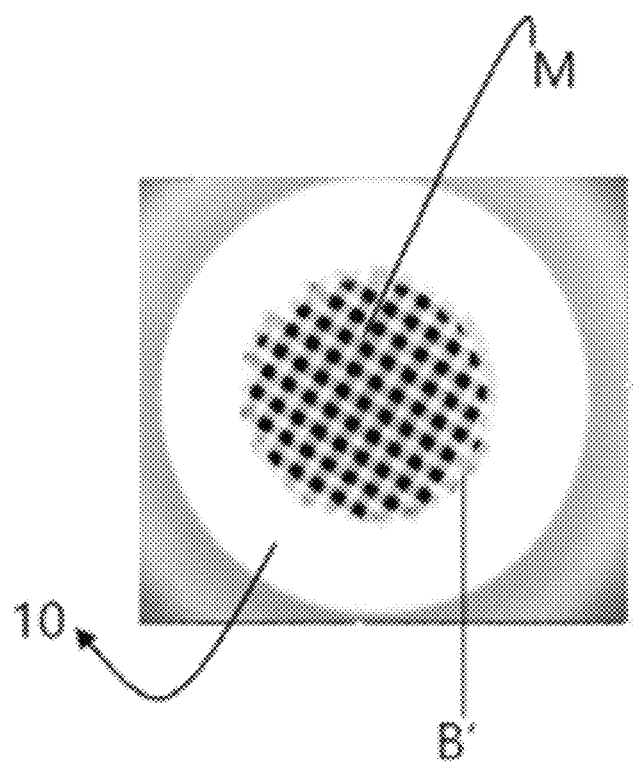
FIG. 8 is a view indicating that burrs are accumulated on a mesh during the process of molding an ear tip.

In this case, as shown in FIG. 8, burrs B', which are silicon powders, are accumulated on the exterior of the mesh M, so that acoustic characteristics are non-uniform and a lot of work is required to remove the burrs.

Figure 9:
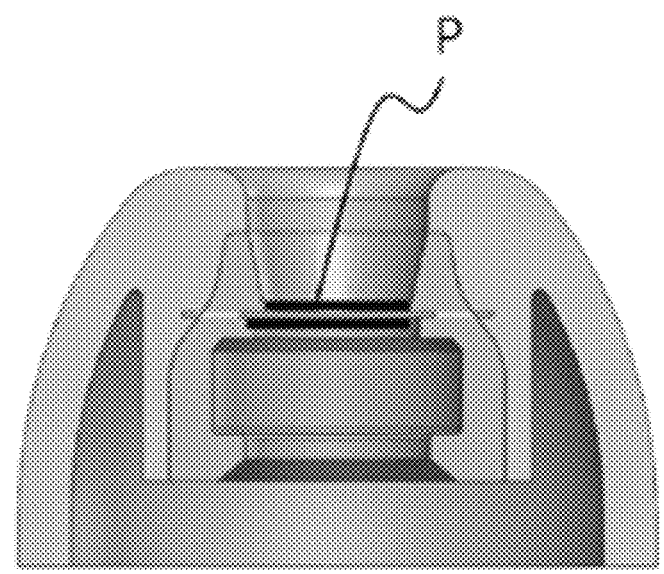
FIG. 9 is a view showing a state before the removal of attached films in the process of molding an ear tip.

Therefore, in the process for manufacturing the ear tip 1 of the present invention, before the step of forming the flange 20, a detachable film or tape F is attached to the top and bottom surfaces of the mesh M. The burrs B' generated in the foaming process are accumulated on the film or tape F and are not accumulated inside the mesh M or the core 10 (see FIG. 9). After the flange 20 has been formed, the film or tape F is removed, so that a cleaning operation is simple.

Figure 10:
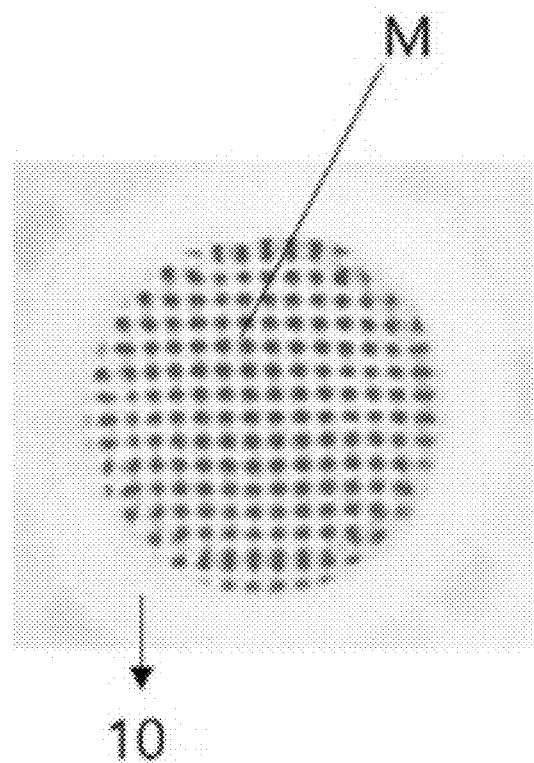
FIG. 10 is a view indicating that no burrs are accumulated on a mesh during the process of molding an ear tip according to the present invention.

FIG. 10 shows the state of the mesh M after the removal of the tape. From this drawing, it can be seen that no burrs are accumulated. The ear tip 1 manufactured as described above has the advantage in which acoustic characteristics are uniform.

According to the present invention, since the flange of the ear tip is made of silicone foam, the ear tip exhibits the effect of providing excellent deformability and adaptability when mounted in the ear canal of the ear, the effect of improving wearing comfort and cleanliness, and the effect of implementing a beautiful design.

In the present invention, since the mesh is mounted near the boundary dividing the upper and lower parts of the ear tip, foreign substances such as earwax are prevented from being introduced into the sound device and deteriorating sound quality.

In the manufacturing process of the ear tip of the present invention, an attachable film or tape is attached to the top and bottom surfaces of the mesh and removed after forming the flange, thereby preventing burrs from accumulating and exhibiting the effect of providing easy cleaning.

The above-described embodiments are merely illustrative of the technical spirit of the present invention, and it will be appreciated by those of ordinary skill in the art to which the present invention pertains that various modifications and variations may be possible within the range that does not depart from the essential features of the present invention.

What is claimed is:

1. An ear tip having a flange made of silicone foam, the ear tip comprising a central core and a flange surrounding the core, wherein the flange is made of silicone foam, and the core is made of a material harder than the silicone foam, wherein:
   the core includes an upper wall formed above a mesh slot in which a mesh is mounted, and a lower part integrated with the upper wall, formed below the mesh slot, and provided with a horizontal portion protruding inward and a vertical portion extending downward from the horizontal portion in an integrated form, and a base including a hook-shaped protrusion protruding inward is formed below the lower part; and
   the flange is manufactured in a structure that covers the overall core except for a bottom surface of the core, the flange includes a sound emission hole extending above the upper wall, a flange upper wall configured to come into close contact with and completely cover an outer surface of the upper wall, and a flange lower wall extending below the flange upper wall to the bottom surface of the core and covering an outer side surface of the lower part, the flange lower wall has a thinner thickness than the flange upper wall, and a dome portion extending further below the flange lower wall while expanding outward from a side surface of the flange upper wall is formed around the flange upper wall and the flange lower wall,
   wherein a space is formed between the flange lower wall and the dome portion, and a lower edge provided by the dome portion and extending further below a bottom surface of the flange lower wall provides a space below the bottom surface of the flange lower wall, which facilitates deformation of the flange when the ear tip is worn.

2. The ear tip of claim 1, wherein the core is made of silicon resin.

3. A method of manufacturing the ear tip set forth in claim 1, the method comprising:
   molding the core by inserting a mesh as an insert and then injecting plastic resin; and
   molding the flange by foam-molding a silicone material, forming the flange, on a mold of the mesh and the core.

4. A method of manufacturing the ear tip set forth in claim 2, the method comprising:
   molding the core by inserting a mesh as an insert and then injecting plastic resin; and
   molding the flange by foam-molding a silicone material, forming the flange, on a mold of the mesh and the core.

5. The method of claim 3, further comprising, before molding the silicone, attaching attachable films or tapes to top and bottom surfaces of the mesh, thereby preventing burrs generated during the molding of silicone from adhering to the mesh.

* * * * *